Aug. 25, 1959  C. M. POPE  2,901,143
UNDERWATER CAMERA CASE
Filed Dec. 3, 1954  2 Sheets-Sheet 1
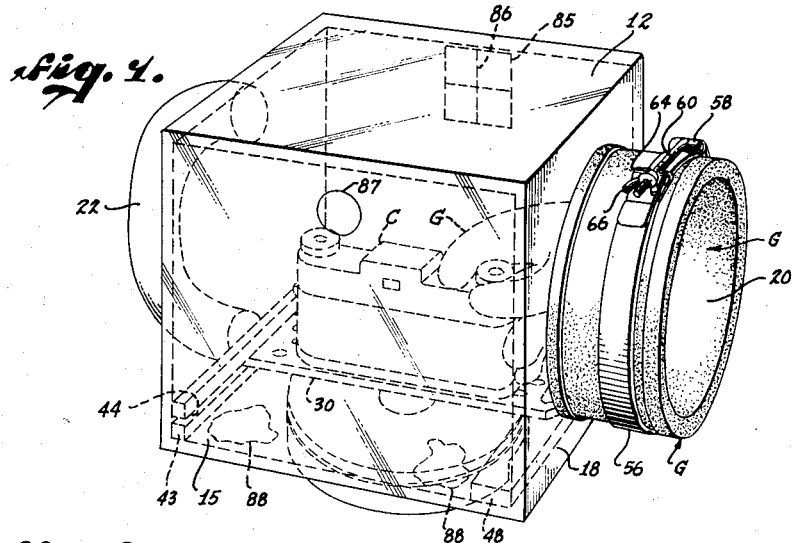
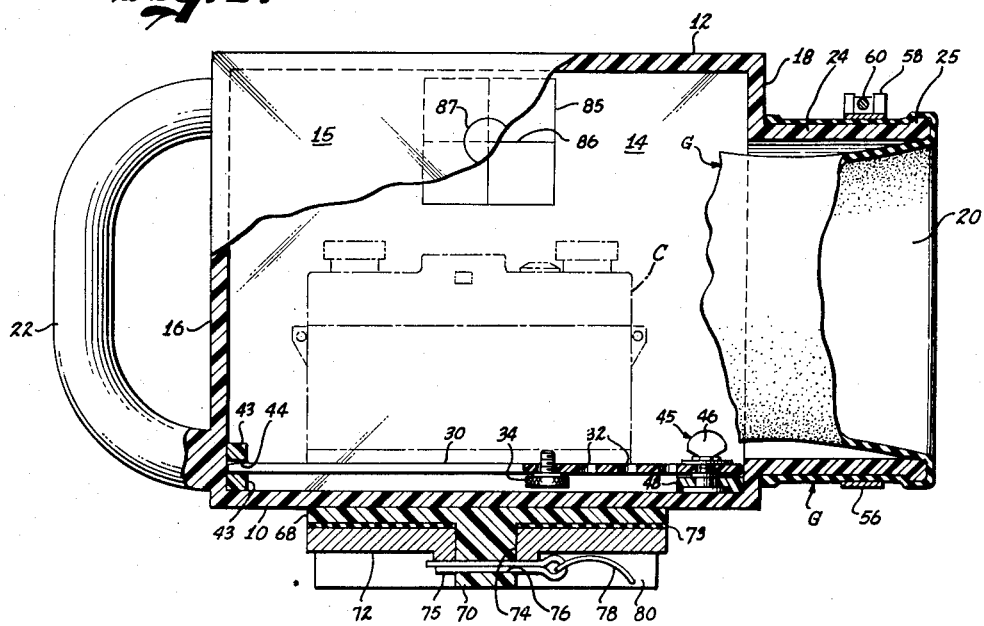
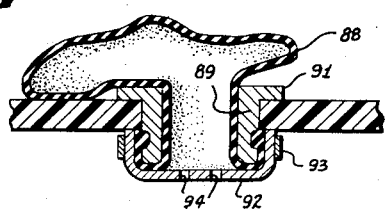
CHARLES M. POPE,
INVENTOR.
BY
ATTORNEY.

Aug. 25, 1959   C. M. POPE   2,901,143
UNDERWATER CAMERA CASE
Filed Dec. 3, 1954   2 Sheets-Sheet 2

CHARLES M. POPE,
INVENTOR.

BY George N. Smyth
ATTORNEY.

ବ୍ଧ2,901,143
UNDERWATER CAMERA CASE

Charles M. Pope, El Segundo, Calif.

Application December 3, 1954, Serial No. 472,956

1 Claim. (Cl. 220—85)

This invention relates to underwater photography and pertains to the construction of a fluid-tight casing to house a camera for underwater use. The invention solves certain problems in the construction of such a casing and in addition provides certain features to simplify underwater photography.

One problem to which the invention is directed is to provide a casing construction that will permit a camera to be readily admitted into the casing or to be withdrawn from the casing, that will permit manipulation of the camera controls when the camera is inside the casing, and that will contain the camera in a positively fluid-tight manner for underwater usage. This problem is not solved satisfactorily if it is a time-consuming task to install or withdraw the camera, or if numerous seals provide numerous points at which leakage may develop, or if movable controls extend through the casing wall and are provided with packing that must be given continual care and atttention.

The invention solves this problem by providing the the camera casing with a single opening large enough to admit the camera, and by further sealing this opening with a removable flexible member of rubber-like sheet material that permits the operator to manipulate the camera controls underwater.

Another problem is to provide such a casing construction that will permit the camera to be fixedly anchored therein in a simple and rapid manner. A camera has a threaded socket on its underside that may be used for this purpose, but the problem arises as to how a mounting screw inside the casing can be manipulated into engagement with the camera socket for this purpose. This problem is met by a removable support member that may be anchored to the camera outside of the casing and then may be inserted through the casing opening into fixed position inside the casing. A feature of the preferred practice of the invention is that the removable support member makes tongue and groove engagement with the side of the casing furthest removed from the casing opening and quick-operating means engages the removable support at the side of the casing adjacent the casing opening.

The invention is further directed to the problem of providing a casing that may be readily adapted for use with cameras of different sizes and types. To this end the removable support member has numerous apertures for selective use in fixing the position of the camera thereon, and the removable support member itself is adjustable forward and rearward in the casing. A feature of the invention is the use of eccentric abutment members to immobilize the camera on the support member, which abutment members may be mounted selectively at various of the numerous apertures.

It is also a problem to sight a housed camera on a subject since the operator cannot place his eye against the view finder lens of the enclosed camera. A view finder may be mounted on the exterior of the casing for this purpose, but cannot be satisfactory because it is not only in the way and vulnerable to damage, but also is spaced so far from the camera axis as to make parallax troublesome. The invention avoids these difficulties by providing a casing with transparent forward and rearward walls and by outlining sighting areas on these walls along an axis that is relatively close to the camera axis.

Since a sealed camera casing of this type is naturally bouyant it is desirable to add weight to lessen its bouyancy and make the casing more manageable underwater. In an emergency, however, it may be imperative to release the camera and in such an event the camera should rise to the surface rather than sink. The invention takes this problem into consideration by providing a quickly detachable weight which may be released from the casing in an emergency. A feature of the preferred practice of the invention in this regard is the placement of the weight on the bottom side of the camera casing to cause the casing to tend to take an upright position when submerged in water.

An important feature of the invention is the concept of sealing the casing opening with a glove of rubber-like material. For this purpose the opening in the side of the casing is provided with an external cylindrical flange. The open end of the glove is simply telescoped over this cylindrical flange and is held in sealing contact therewith by a quickly removable encircling tension band. The glove may be turned into the camera prior to the sealing action accomplished by tightening the band, or the glove may be left extending outward from the casing.

The glove acts as a flexible membrane that permits equalization of the air pressure inside the camera with the water pressure outside the camera. If the glove is turned outward from the casing prior to tightening of the encircling sealing band, the glove will provide a greater range of adjustment for pressure equalizaiton. A further advantage of having the glove normally turned outward is that when the operator reverses the glove inwardly to manipulate the camera controls, the air entrapped in the casing is appreciably contracted in volume to raise the pressure inside the casing above the pressure of the surrounding water and thereby discourage leakage into the casing around the juncture between the glove and the casing wall.

A still further problem is to provide a casing that may be conveniently and effectively steadied for an underwater shot. This problem arises because two hands are required to steady the casing and yet one hand must be used to maniplate the shutter mechanism of the camera. This problem does not arise in ordinary photography on dry land because the hand that operates the shutter may also grasp the camera. In this instance, however, the enclosed camera is not sufficiently accessible to be grasped effectively by the gloved hand of the operator.

The invention meets this problem by making the external cylindrical wall of the camera opening of liberal axial dimension and by further providing the camera with an external handle on the side of the casing opposite from the casing opening. This arrangement permits one hand to steady the casing by grasping the handle and permits the other hand to cooperate by light pressure against the wall around the opening. It can be appreciated that finger pressure through the glove forward against the camera or camera controls accompanied by rearward pressure by the palm or wrist through the glove against the wall around the opening of the casing will steady the casing when the other hand firmly grasps the opposite external handle.

To compensate for the effect of water pressure acting exteriorly of the glove when the casing is in use underwater, the present invention provides means for compressing the air within the casing as the pressure of the water increases. In the illustrated embodiment of the present invention, this means comprises a plurality of flexible wall elements carried within the casing but opening exteriorly of the same to permit water to fill the elements and distend the walls thereof as the pressure of the water increases with the depth thereof. As the elements are carried within the casing, the distention of the flexible walls thereof will displace and thus compress the air within the casing. This compression of the air within the casing counteracts the effect of the water pressure acting on the glove so that there is little or no difference in the pressures acting on the opposite sides of the wall elements of the glove.

The various features and advantages of the invention may be understood from the following detailed description considered with the accompanying drawings:

In the drawings, which are to be regarded as merely illustrative:

Figure 1 is a perspective view of a casing embodying the preferred practice of the invention;

Figure 2 is a view of the casing partly in side elevation and partly in section;

Figure 7 is a fragmentary view on a slightly enlarged scale taken as indicated by the line 7—7 of Figure 3.

Figure 3:
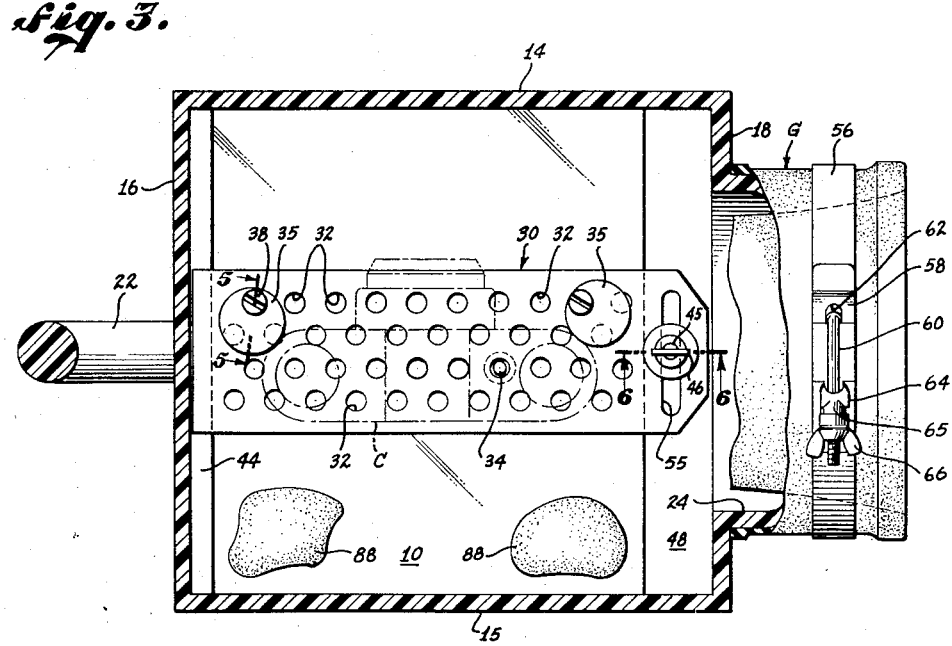
Figure 3 is a view of the casing partly in plan and partly in section.
Figure 4:
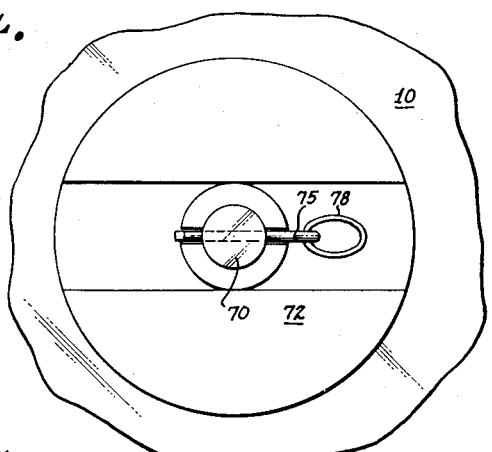
Figure 4 is a fragmentary bottom view of the casing showing how a weight may be mounted thereon in a quickly releasable manner.

The drawings show a box-like casing which may be constructed in a fluid tight manner from any suitable transparent or semi-transparent plastic material. The casing has a bottom wall 10, a top wall 12, a forward wall 14, a rearward or back wall 15, a left side wall 16 and a right side wall 18 having a relatively large access opening 20 therein. The left side wall 16 is provided with an exterior U-shaped handle 22. The access opening 20 in the right side wall 18 is preferably surrounded by an external cylindrical wall or flange 24 that is formed with a rim bead 25. This access opening 20 is large enough to admit the operator's hand and also to admit cameras of various sizes and types.

The drawings show how a camera C, shown in phantom, may be mounted on a removable support member such as a removable plate 30 of plastic material. The support plate 30 has numerous widely distributed apertures 32 which may be used selectively to receive a knurled thumb screw 34 of a well known type adapted for engagement with the usual threaded socket on the underside of a camera, which socket is commonly used for mounting the camera on a tripod. Preferably additional means is provided for abutment against the camera to insure immobilization of the camera against rotation on the axis of the thumb screw 34. For this purpose the preferred embodiment of the invention provides a pair of adjustable abutment members 35 that may be pivotally mounted selectively in the apertures 32.

Figure 5:
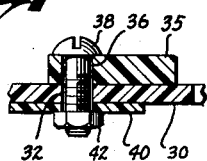
Figure 5 is a fragmentary section on a slightly enlarged scale taken as indicated by the line 5—5 of Figure 3.
Figure 6:
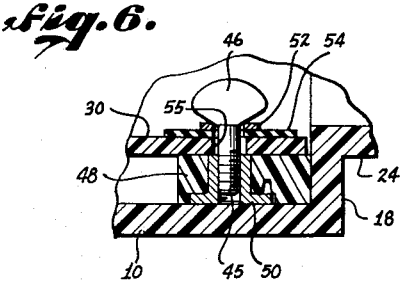
Figure 6 is a fragmentary section on a slightly enlarged scale taken as indicated by the line 6—6 of Figure 3.

As shown in Figures 3 and 5, the adjustable abutment members 35 may be in the form of relatively thick plastic discs each of which has an off-center bore 36 to receive a suitable screw 38. Figure 5 shows how each screw 38 may extend through a selected aperture 32 of the support plate 30 with a washer 40 and a nut 42 on the lower end of the screw. It is apparent that the screw 38 may be tightened to hold the eccentric surface of the disc against the side of the camera as indicated in Figure 3.

It is apparent that with the support plate 30 removed from the interior of the casing, it is a simple matter to mount the camera C thereon by means of the thumb screw 34 and to immobilize the camera relative to the support plate by means of the adjustable abutment members 35. After the camera is mounted in the desired position on the support plate 30, the support plate with the camera thereon is inserted into the interior of the casing through the access opening 20 and is releasably anchored inside the casing by any suitable means.

In the present embodiment of the invention, the end of the support plate 30 that is furthest removed from the access opening 20 makes tongue-and-groove engagement with the exterior of the casing. For this purpose two parallel spaced strips 43 of plastic material are shown bonded to the inner surface of the left side wall 16 of the casing near the casing bottom wall 10, the two strips forming a groove 44 (Figure 2) dimensioned to receive the end of the support plate 30 with a relatively snug fit.

The second end of the support plate 30 which is nearest the access opening 20 may be releasably retained, for example, by means of a removable screw 45, the head of which is in the form of a finger piece 46. A strip of plastic material 48 is bonded to the bottom wall 10 of the casing adjacent the right side wall 18 and the screw 45 threads into a suitable insert 50 that is embedded in the strip 48. Preferably the screw 45 is provided with a small metal washer 52 and a larger plastic washer 54 for exerting immobilizing pressure against the upper surface of the support plate 30 and preferably the support plate is formed with a slot 55 to receive the screw as best shown in Figure 3.

The access opening 20 of the casing is normally closed by a suitable glove G of rubber-like material with the open end of the glove telescoped over the cylindrical wall 24 and secured thereon by a tension band 56 of a well known type as best shown in Fig. 3. The two ends of the tension band 56 overlap and the outer of the two overlapping ends is bent back on itself to form a loop 58 in which is journalled a T-shaped screw 60, the band loop having a slot 62 to clear the shank of the screw. Near its other end the tension band 56 is provided with a pair of laterally spaced shoulders 64 for engagement by a sleeve 65 that is slidingly mounted on the T-shaped screw 60. A winged nut 66 threaded onto the end of the T-shaped screw 60 abuts the slidable sleeve 65 and may be screwed against the sleeve to tighten the two ends of the tension band.

It is contemplated that the bottom of the casing will be weighted in some suitable manner. For this purpose, a large plastic disc 68 having a downwardly extending axial boss 70 may be permanently bonded to the underside of the bottom wall 10 of the casing to hold a ring-shaped lead weight 72. The weight 72 has a central aperture 74 to receive the axial boss 70 and is releasably retained by means of a straight cotter pin 75 that extends through an axial bore 76 in the boss 70. Preferably the cotter pin is provided with a wire metal loop 78 to serve as a handle for convenience in withdrawing the cotter pin to release the weight 72 in an emergency. In the construction shown, the weight 72 is cut away to form a diametrical groove 80 on its underside and the cotter pin 75 is positioned in this groove, the side walls of the groove affording a desirable amount of protection for the cotter pin. Preferably a line 73 of rubber-like material is interposed between the weight 72 and the disc 68 under slight compression to prevent relative vibratory movement of the weight.

For the purpose of sighting the camera on subjects to be photographed, the forward wall 14 of the camera has a rectangle 85 marked thereon by thin black lines which may be etched into or otherwise formed on the surface of the wall. Preferably the rectangle is spanned by intersecting lines 86 to serve as cross hairs to indicate the center of the viewing field. The back wall 15 of the casing is provided with a similar circular line 87. The circular area defined by the line 87 on the back wall and the area defined by the rectangle 85 on the forward wall lie on a horizontal axis which is parallel to the bottom of the casing and is therefore parallel to the axis of a camera C when the camera is mounted on the support plate 30 in the manner shown in the drawing. It will be noted that the sighting axis extends through a clear space immediately above the camera C.

To compensate for the effect of the pressure of the water on the flexible wall of the glove G, the present invention provides means for compressing the air within the casing as the water pressure increases. Although this means may comprise any means desired, it is now preferred to use a plurality of flexible walled, bag-like elements 88 carried within the casing but yet communicating exteriorly of the same to permit water to fill the elements and distend the walls thereof as the pressure of the water increases.

The elements 88, referring now to Figure 7, are mounted to the casing to be carried interiorly thereof by short tubular members 89 passed through openings formed in the lower wall of the casing. The annular space between the members 89 and the openings in the wall is sealed by a bonding agent which cohesively holds the member in place on the wall. Each of the members 89 is preferably formed at the inner end thereof with an outturned flange 91 which facewisely engages and is cohesively bonded to the inner surface of the lower wall of the casing.

In mounting the elements 88 to the casing, an element is inserted through the bore of each tubular member 89 and the open end thereof reversely bent back and telescopically fitted over the projecting end of the member 89. A cap 92 is then slipped over the portion of the element fitted about the projecting end of the member 89, after which an annular band clamp 93 is placed about the cylindrical wall of the cap 92 and the clamp tightened to compressively hold the cylindrical wall of the cap 92 and the portion of the element 88 telescopically fitted over the projecting end of the element in place. The cap 92 is preferably formed of some resilient material such as rubber with a Shore hardness of approximately 60 and the compression by the clamp 93 of the wall of this cap not only securely holds the element 88 telescopically about the projecting end of the member 89, but also seals the jointure.

The transverse wall of the cap 92 is formed with a plurality of apertures 94 so that water may pass through these apertures to enter and fill the elements 88 as the casing is submerged in the water. As the pressure of the water filling the elements 88 increases, the wall of each element 88 will distend and this distention displaces air within the casing to result in a compression of the air automatically with increase of the depth of the water. This compression of the air by distention of the elements 88 counteracts the effect of the water pressure acting on the one side of the wall of the glove G to the end that there is little or no difference in the pressures acting on the opposite sides of the wall elements of the glove. This insures that the glove will remain substantially undistended regardless of the depth of the water and insures the efficient use of the glove to manipulate the various controls of the camera.

The elements 88 are prevented from being moved exteriorly of the case by the cap 92 so there is no danger of the elements being ruptured by being forced into contact with sharp rocks or the like in the use of the casing. It should also be noted that the elements 88 are so mounted to the casing as not to interfere with the manipulation of the camera or to block the line of sight through the field-defining elements of the casing.

The manner in which the invention serves its purpose may be readily understood from the foregoing description. With the glove G removed from the casing and with the support plate 30 removed from the interior of the casing, it is a simple matter to mount a camera C on the support plate in the manner heretofore described. With the camera attached to the support plate 30, it is a simple matter to insert the leading end of the support plate into the groove 44 and then to drop the other end of the support plate onto the plastic strip 48. The operator adjusts the support plate forward or rearward, as desired, and then inserts and tightens the screw 45 to completely immobilize the support plate and camera.

The glove G is then telescoped over the cylindrical wall 24 and the tension band 56 is then applied and tightened to hold the glove in sealing contact with the cylindrical wall. As heretofore stated, the glove at this time either may be turned inward into the interior of the casing, as shown in Figures 2 and 3, or may be turned outward along the extended axis of the access opening.

To use the camera underwater, the operator grasps the handle 22 with his left hand and inserts his right hand into the glove G through the access opening 20 to manipulate the camera controls in the manner indicated in Figure 1. With the left hand grasping the handle 22 and the right hand steadying the camera in the manner heretofore described, the operator sights through the circle 87 and the rectangle 85 to train the camera on a desired subject and then actuates the shutter mechanism of the camera. It is a simple matter to use the glove G to trip the camera shutter, to advance the film, to adjust the diaphragm of the lens, and to adjust the time setting of the shutter.

The presence of the weight 72 on the underside of the camera decreases the camera buoyancy to an extent that makes the camera manageable with ease underwater and, moreover, the weight being on the bottom of the casing causes the casing to seek a desirable upright position. In an emergency, it is a simple matter to grasp the loop 78 and withdraw the cotter pin 75 to permit the weight 72 to fall free from the casing, whereupon the casing rises rapidly to the surface where it may be readily recovered.

Although the now preferred embodiment of the present invention has been shown and described herein, it is to be understood that the invention is not to be limited thereto, for it is susceptible to changes in form and detail within the scope of the appended claim.

I claim:

A camera case comprising a transparent, rectangular receptacle having a circular opening in one side thereof, a hollow cylindrical member integrally joined to said one side of the receptacle about the periphery of the opening and projecting outwardly from said side and a flexible glove connected to that end of the cylindrical member remote from the receptacle, said glove being sealed to said named end of the cylindrical member throughout the periphery of the open end of the glove with the glove projecting inwardly within the cylindrical member and receptacle and having its closed end disposed within the receptacle, said closed end of the glove including a plurality of fingers, thus to permit insertion of one's hand into the glove for the purpose of manipulating a camera disposed within the receptacle.

References Cited in the file of this patent

UNITED STATES PATENTS

| | | |
|---|---|---|
| 1,282,432 | Katayama | Oct. 22, 1918 |
| 2,001,682 | Jackman | May 14, 1935 |
| 2,487,868 | Grigsby | Nov. 15, 1949 |

FOREIGN PATENTS

| | | |
|---|---|---|
| 346,114 | Germany | Dec. 24, 1921 |
| 421,584 | Italy | May 28, 1947 |
| 433,686 | Italy | Apr. 13, 1948 |
| 1,043,770 | France | Nov. 12, 1953 |
| 1,065,959 | France | Jan. 13, 1954 |

OTHER REFERENCES

Davis: "The Camera" magazine, February 1937, pages 95–99.

Cross: Text, "Underwater Photography and Television," published February 21, 1954, by Exposition Press, New York, Figs. 10 to 15, inclusive, on four unnumbered sheets between pages 66 and 67 cited.